United States Patent

Bohm

[11] Patent Number: 5,974,864
[45] Date of Patent: Nov. 2, 1999

[54] LEAK DETECTOR WITH BACK-UP PUMP

[75] Inventor: Thomas Bohm, Cologne, Germany

[73] Assignee: Leybold Vakuun GmbH, Germany

[21] Appl. No.: 08/981,091

[22] PCT Filed: Apr. 26, 1996

[86] PCT No.: PCT/EP96/01772

§ 371 Date: Dec. 17, 1997

§ 102(e) Date: Dec. 17, 1997

[87] PCT Pub. No.: WO97/01084

PCT Pub. Date: Jan. 9, 1997

[30] Foreign Application Priority Data

Jun. 21, 1995 [DE] Germany ............ 195 22 466

[51] Int. Cl.[6] .................................................. G01M 3/20
[52] U.S. Cl. ............................................................ 73/40.7
[58] Field of Search ................................................ 73/40.7

[56] References Cited

U.S. PATENT DOCUMENTS

| 3,690,151 | 9/1972 | Briggs . | |
|---|---|---|---|
| 3,762,212 | 10/1973 | Morley et al. | 73/40.7 |
| 3,824,839 | 7/1974 | Briggs | 73/40.7 |
| 4,371,323 | 2/1983 | Fischer et al. . | |
| 4,776,207 | 10/1988 | Holme | 73/40.7 |
| 4,779,449 | 10/1988 | Bley et al. | 73/40.7 |
| 5,537,857 | 7/1996 | Bley | 73/40.7 |
| 5,585,548 | 12/1996 | Grosse Bley et al. . | |
| 5,703,281 | 12/1997 | Myneni | 73/40.7 |

FOREIGN PATENT DOCUMENTS

| 859352 | 2/1978 | Belgium . |
|---|---|---|
| 4228313 | 3/1994 | Germany . |

OTHER PUBLICATIONS

IPER PCT/EP96/01772 PCT Article 36 and Rule 70.
Technisches Messen TM 1982–1988 vol. 54, No. 3, 1987, Munchen DE, pp. 96–99 XP002010823.

*Primary Examiner*—Michael Brock
*Attorney, Agent, or Firm*—Wall Marjama Bilinski & Burr

[57] ABSTRACT

The invention concerns a gas leak detector (1) having an inlet (3) enabling connection to a test piece or test chamber, a detector unit disposed within the detector (4), a high-vacuum pump (5) which is connected at one end to the detector unit and through which a test gas, such as helium, passes in the opposite direction, a back-up pump (6), a line (9, 13) joining an outlet of the high-vacuum pump (5) with an inlet of the back-up pump (6), and a line (7, 9) joining the test-piece connector (3) to the high vacuum pump outlet. In order to reduce the complexity and expense necessary to produce the back-up vacuum, the invention proposes that line (13) is fitted with a throttle (14) and including a further line (15) which is fitted with a valve (16), said line directly joining the test piece (3) to the inlet of the back-up pump (6).

4 Claims, 2 Drawing Sheets

LEAK DETECTOR WITH BACK-UP PUMP

FIELD OF THE INVENTION

The present invention concerns a leak detector operated using helium as the test gas.

BACKGROUND OF THE INVENTION

There are known leak detectors of the kind equipped with a test gas detector (commonly a mass spectrometer), a high vacuum pump in which the test gas flows in the opposite direction, as well as a first relatively small back-up pump downstream with respect to the high vacuum pump. Moreover, a further back-up pump is provided having a relatively high pumping speed which serves the purpose of evacuating the test pieces or a test chamber in which leaks in the test pieces are detected. One reason for the use of two back-up pumps is, that on the one hand the test piece or test chamber shall be evacuated as quickly as possible. For this, the pumping speed of the separate back-up pump is made as high as possible. Production of the back-up vacuum required by the high vacuum pump would be possible with the aid of this second high vacuum pump; however, one would suffer a substantial loss in sensitivity. In order to avoid this, a second back-up pump having a relatively low pumping speed is connected downstream of the high vacuum pump.

It is the task of the present invention to reduce the complexity of generating the back-up vacuum in a leak detector of the kind affected here without having to suffer a loss in sensitivity.

SUMMARY OF THE INVENTION

This task is solved through the present invention by the characteristic features of the patent claims.

The proposed schemes are such that a separate back-up pump for the high-vacuum pump can be dispensed with. The valves can be switched in such a manner that on the one hand the test piece or the test chamber linked to the leak detector may be evacuated very quickly and that on the other hand precision leak detection will be possible.

It is particularly advantageous to use as the back-up pump a displacement pump operated according to the spiralling principle, such as known from DE-A-29 27 690, for example, the entire contents of which are hereby incorporated by reference. Pumps of this kind do not require a sealant (oil) in the pumping chamber so that—if the high vacuum pump is a friction pump—only oil-free vacuum pumps are present. The risk of contaminating the test piece or the test chamber with hydrocarbon molecules does not exist.

BRIEF DESCRIPTION OF THE DRAWINGS

Further advantages and details of the present invention shall be explained on the basis of the following design examples.

DETAILED DESCRIPTION OF THE INVENTION

Figure 1:
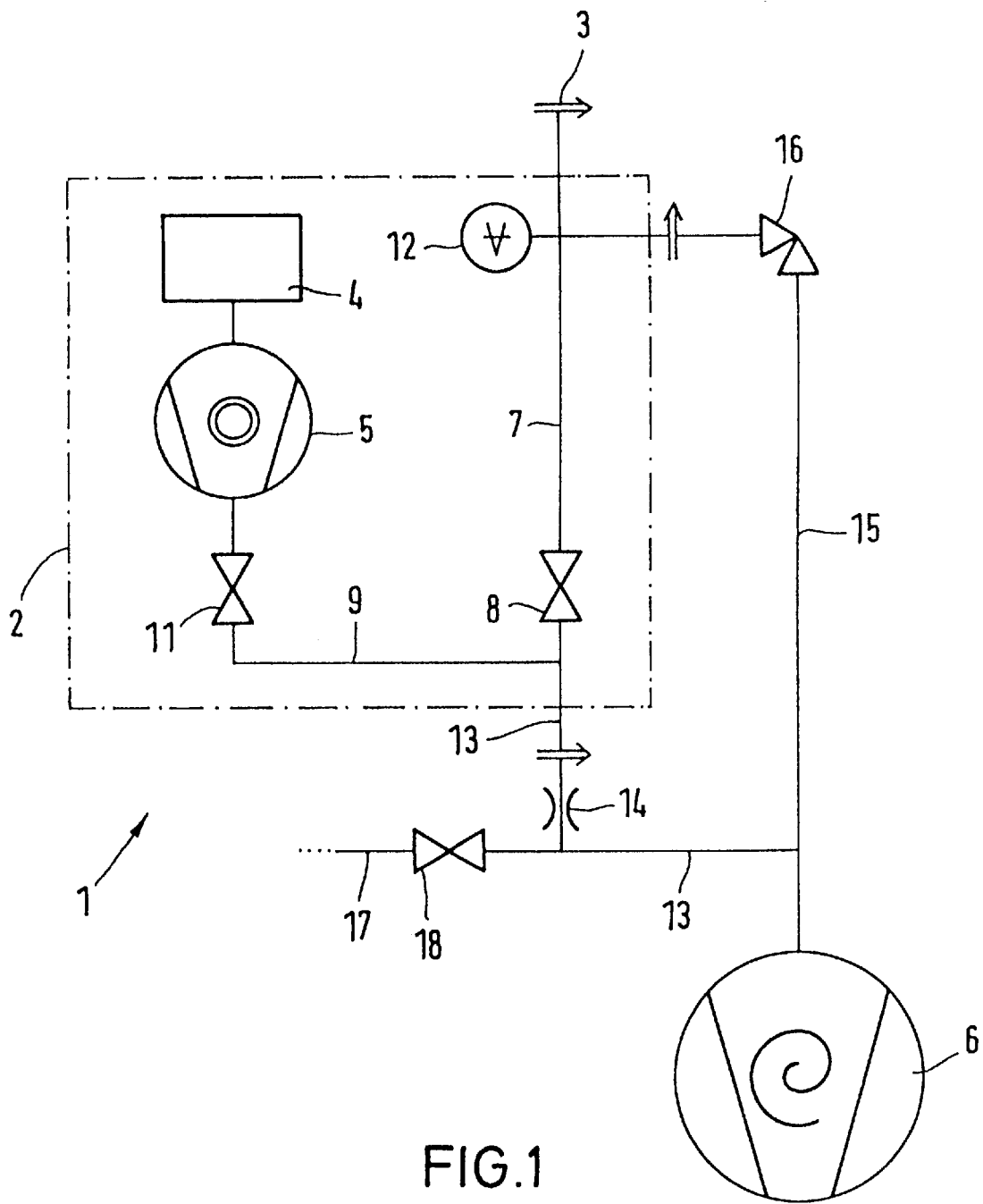
FIG. 1 is a leak detector according to the present invention with a single-stage high vacuum pump in the upper section and FIG. 2 shows a leak detector with a multi-stage high vacuum pump.

In the two design examples which follow the leak detector as such is designated as 1, its upper section as 2 (dash-dot line), the inlet or the connection for the test piece as 3, the test gas detector as 4, the high vacuum pump as 5, and the back-up pump located outside the upper section 2 as 6. The connection for the test piece 3 is linked via line sections 7 (with valve 8) and 9 (with valve 11) to the outlet of the high vacuum pump 5. Pressure gauge 12 is connected to line 7. Connected between valves 8 and 11 is a line 13 which leads to the inlet of the back-up pump 6 and which is equipped with a choke 14. Moreover, the connection 3 for the test piece and the inlet of the back-up pump 6 are connected via line 15 to the valve 16. A line incorporating valve 18 is designated as 17, which opens into line 13 and which—as detailed below—serves the purpose of admitting purge gas.

In the design example according to FIG. 1 the high vacuum pump 5 is a single-stage turbomolecular pump. During standby all valves—except valve 11—are closed. In this phase the high vacuum pump 5 produces the pressure necessary for operating the mass spectrometer 4. The back-up vacuum necessary to operate the high vacuum pump 5 is produced by back-up pump 6, the inlet of which is linked via the lines 9 (with valve 11 open) and 13 to the outlet of the high vacuum pump 5.

In order to commence with the measurement, valve 11 is closed and valves 8 and 16 are opened. Thus the connection 3 for the test piece is linked to the back up pump 6 via a relatively large cross section. The relatively high pumping speed of the back-up pump 6 can be fully utilized so that a rapid evacuation of the test piece is possible. If the pressure recorded by the pressure gauge is sufficiently low (less than 2 mbar, for example), then gross leak detection may commence. Valve 11 is opened for this. Possibly taken in test gas passes via lines 7, 9 as well as in a counterflow through the high vacuum pump 5 into the test gas detector 4 and it is recorded with its assistance. During gross leak detection the inlet pressure decreases further. Once the inlet pressure has reached 0.05 mbar, for example, precision leak detection may commence. Valve 16 is closed for this. During this phase the detection of smallest leak rates is possible owing to the reduced pumping speed of the back-up pump 6[1]) because of throttle 14.

In order to switch over to phase after the measurement, all valves are closed first and valve 18 is opened. Purge gas (air, for example) is admitted via line 17 so as to reduce a helium background which may have built-up in the back-up pump 6[1]) during the measurement. For this it suffices to open valve 18 for a short period of time (10 to 20 s).

[1]) The German text reads "5" here where "6" would be appropriate and in line with the drawings and the remaining text. So "6" has been assumed for the translation.

Figure 2:
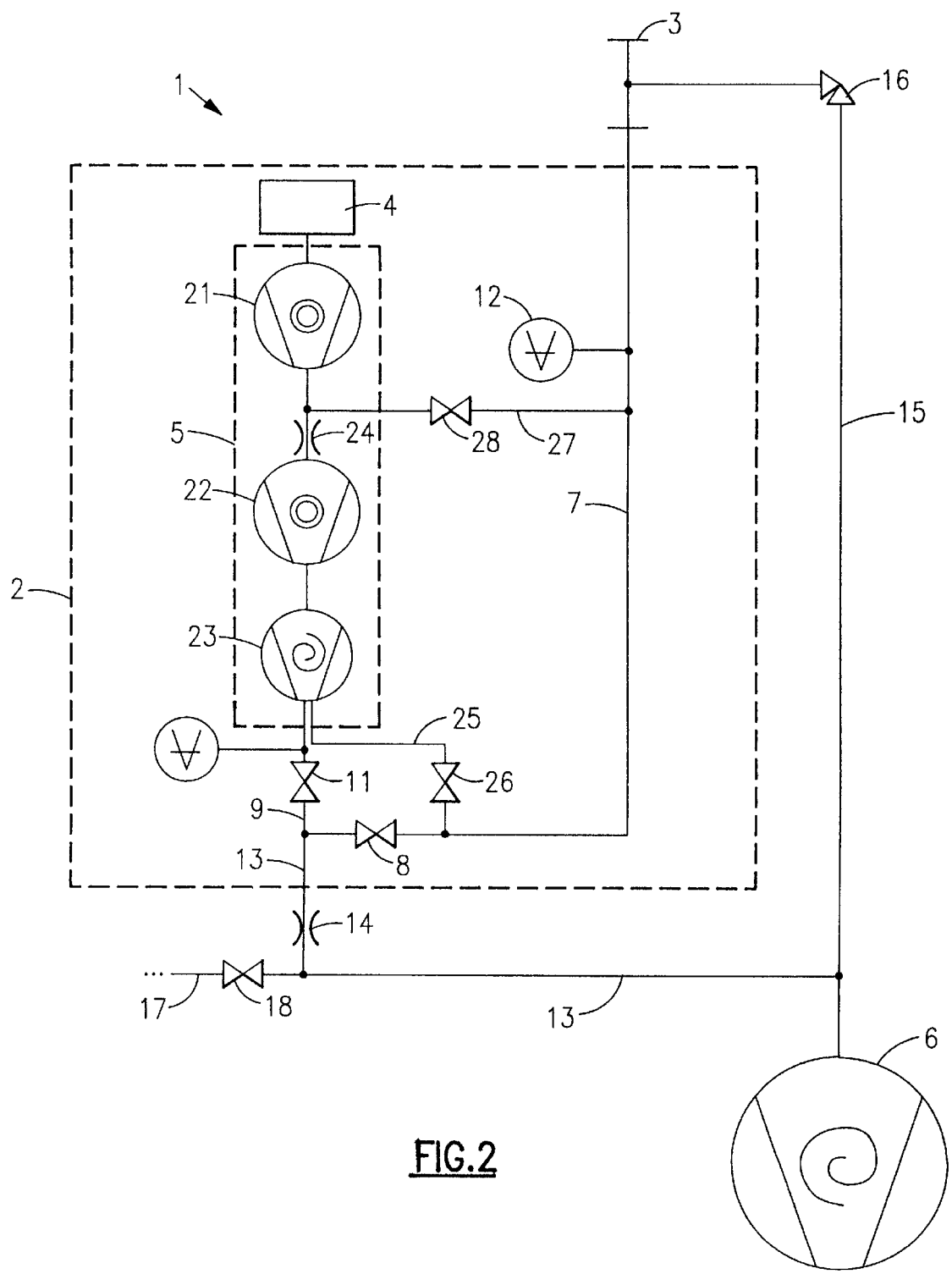

In the design example according to FIG. 2 the high vacuum pump 5 is of the multi-stage type. The high vacuum pump 5 comprises three friction pump stages (21, 22, 23), of which two (21, 22) are designed as turbomolecular pump stages. Choke 24 is located between these stages. The stage 23 on the side of the back-up vacuum is designed as a molecular pump and thus improves the forevacuum tolerance of the high vacuum pump 5. A bypass line 25 with a valve 26 is assigned to the valves 8, 11.

Also connected to line 7 is the line 27[2]) with the valve 28[2]), which opens into the connecting line between the two turbomolecular pump stages 21, 22, specifically in the direction of the flow ahead of the throttle 24.

[2]) Numbers 27 and 28 are missing in drawing FIG. 2.

As in the design example according to FIG. 1, all valves—except valve 11—are closed during standby. Also the first part of the measurement phase—evacuation of the test piece 3—corresponds to the implementation according to FIG. 1. Gross leak detection commences by opening valves 11 and 26. Owing to the improved forevacuum tolerance of the high vacuum pump 5 this may be performed already at a pressure of about 2 mbar. At a pressure of about 0.1 mbar valve 28 opens and 26 is closed. This step is combined with an increase in sensitivity. At a pressure of $5 \times 10^{-2}$ mbar valve 16 closes, so that thereafter the smallest leaks may be detected.

The properties of choke 14 are so selected that the effective pumping speed ahead of the choke only amounts to 10–20% of the full pumping speed of the back-up pump 6. The sensitivity of the leak detector increases as the effective pumping speed decreases.

What is claimed is:

1. A gas leak detector utilizing a test gas, said detector comprising an inlet enabling connection to one of a test piece and a test chamber, a detector unit, a high-vacuum pump connected at one end to said detector unit and through which said test gas oppositely passes, a single back-up pump which along with said high-vacuum pump includes an inlet and an outlet, a first line joining the outlet of the high-vacuum pump with the inlet of the single back-up pump, a second line joining one of the test piece and the test chamber with the outlet of the high-vacuum pump, said first line including a choke, and a third line directly connecting said one of said test chamber and said test piece to the inlet of said single back-up pump, said third line having a valve, allowing said single back-up pump to separately and selectively evacuate either of said test piece and said test chamber as well as to provide a back-up vacuum for said high vacuum pump.

2. A gas leak detector as recited in claim 1, wherein the back-up pump is a displacement pump which operates according to the spiraling principle.

3. A gas leak detector as recited in claim 1, wherein the first line includes a purge-gas inlet disposed between said choke and the inlet of said back-up pump.

4. A gas leak detector as recited in claim 1, wherein the high vacuum pump is a multi-stage friction pump.

* * * * *